United States Patent
Powell, III et al.

(10) Patent No.: US 8,891,415 B2
(45) Date of Patent: Nov. 18, 2014

(54) WIRELESS COMMUNICATIONS SYSTEM INCLUDING SINGLE CHANNEL RETRANSMISSION AND RELATED METHODS

(71) Applicant: Harris Corporation, Melbourne, FL (US)

(72) Inventors: Nelson H. Powell, III, Penfield, NY (US); James P. Lill, Rochester, NY (US); William S. Rogers, Webster, NY (US)

(73) Assignee: Harris Corporation, Melbourne, FL (US)

( * ) Notice: Subject to any disclaimer, the term of this patent is extended or adjusted under 35 U.S.C. 154(b) by 161 days.

(21) Appl. No.: 13/644,833

(22) Filed: Oct. 4, 2012

(65) Prior Publication Data

US 2014/0098718 A1    Apr. 10, 2014

(51) Int. Cl.
*H04B 7/14*    (2006.01)

(52) U.S. Cl.
USPC .......................................... 370/279; 370/315

(58) Field of Classification Search
CPC ......... H04B 7/15592; H04W 72/0446; H04W 88/04
See application file for complete search history.

(56) References Cited

U.S. PATENT DOCUMENTS

| | | | |
|---|---|---|---|
| 4,513,412 A | 4/1985 | Cox | |
| 7,031,658 B2 | 4/2006 | Dibernardo | |
| 2008/0198789 A1* | 8/2008 | Brown et al. | 370/315 |
| 2011/0116432 A1* | 5/2011 | Doppler et al. | 370/312 |
| 2012/0002595 A1* | 1/2012 | Mao et al. | 370/315 |
| 2012/0155376 A1* | 6/2012 | Senarath et al. | 370/315 |
| 2012/0307718 A1* | 12/2012 | Nakasato | 370/315 |
| 2013/0003645 A1* | 1/2013 | Shapira et al. | 370/315 |
| 2013/0315131 A1* | 11/2013 | Brown et al. | 370/315 |

* cited by examiner

*Primary Examiner* — Chi H Pham
*Assistant Examiner* — Fahmida Chowdhury
(74) *Attorney, Agent, or Firm* — Allen, Dyer, Doppelt, Milbrath & Gilchrist, P.A.

(57) ABSTRACT

A wireless communications system may include wireless communications devices configured to communicate with one another on a given channel via a time division based communications protocol. A communication initiation wireless communications device configured to transmit data in an initiator time slot of the given channel. A repeater wireless communications device configured to receive the transmitted data from the communications initiation wireless communications device in the initiator time slot and retransmit the data in a repeater time slot of the given channel. A receiver wireless communications device configured to determine a respective quality metric for data from each of the initiator time slot and the repeater time slot, and use data from the initiator time slot or the repeater time slot based upon the respective quality metrics thereof.

19 Claims, 14 Drawing Sheets

WIRELESS COMMUNICATIONS SYSTEM INCLUDING SINGLE CHANNEL RETRANSMISSION AND RELATED METHODS

FIELD OF THE INVENTION

The present invention relates to the field of communications and, more particularly, to wireless communications and related methods.

BACKGROUND OF THE INVENTION

It may be desirable to retransmit data, for example, voice data, in a wireless communications system. One approach to retransmitting data may include implementing a retransmission site or system using two wireless communications devices. A two device retransmission system typically operates using multiple frequencies and multiple antennas, for example, one for receiving data and another for retransmitting the data, to avoid a collision. Co-location interference mitigation techniques are typically used in such a two device approach. In some implementations, the two wireless communications devices may be configured to operate in a back-to-back configuration.

One example, of a two device retransmission system is the Single Channel Ground and Airborne Radio System (SINCGARS). SINCGARS uses multiple wireless communications devices at a given retransmission site and operates using multiple frequencies. One frequency is for a transmitting network. One frequency is for a repeater network. One radio receives data while one radio transmits. This may be accomplished via a back-to-back cable connection.

Another approach to retransmitting data may include implementing a retransmission site or system using a single wireless communications device. Similar to the two device approach described above, a single device retransmission system operates using multiple frequencies and multiple antennas. Operator coordination is also typically required for retransmission sequences. For example, operator coordination may be desired when the retransmission is directly performed. Furthermore, in a single device system retransmission of streaming data, such as, for example, streaming audio, may not be possible, as retransmission are performed in bursts rather than a synchronous data stream.

U.S. Pat. No. 4,513,412 to Cox discloses a time division adaptive retransmission technique for portable radio telephones. More particularly, Cox discloses a portable transceiver and a remote terminal station each using at least two antennas with different polarization transmission capabilities for an adaptive retransmission technique. The terminal station transmits the same preamble signal in at least two time slots of a frame period of a time division sequence using the antenna receiving the strongest signal from the transceiver in the immediately prior frame period followed by a binary message signal using the same antenna. The transceiver receives each of the preamble transmissions from the terminal station via a separate one of differently oriented antennas and determines which antenna received the strongest signal. The message signal from the terminal station is then received via the antenna of the transceiver having received the strongest signal and also sends its response message signal on that antenna during a separate time slot of a frame period.

U.S. Pat. No. 7,031,658 to Dibernardo discloses a single radio retransmission system using a half duplex radio. More particularly, Dibernardo discloses a transmitting terminal using only a transmit segment of a frame, and a receiving terminal using only the receive segment of each frame. A retransmission terminal receives data in its receive segment and transmits the data, buffered, in its transmit segment.

SUMMARY OF THE INVENTION

In view of the foregoing background, it is therefore an object of the present invention to provide a single channel wireless retransmission system.

This and other objects, features, and advantages in accordance with the present invention are provided by a wireless communications system that includes a plurality of wireless communications devices configured to communicate with one another on a given channel via a time division based communications protocol. The plurality of wireless communications devices includes a communication initiation wireless communications device configured to transmit data in an initiator time slot of the given channel. The wireless communications system also includes a repeater wireless communications device configured to receive the transmitted data from the communications initiation wireless communications device in the initiator time slot and retransmit the data in a repeater time slot of the given channel. A receiver wireless communications device is configured to determine a respective quality metric for data from each of the initiator time slot and the repeater time slot, and use data from the initiator time slot or the repeater time slot based upon the respective quality metrics thereof. Accordingly, the wireless communications system advantageously retransmits data on a single channel. More particularly, a single wireless communications device, i.e., the repeater wireless communications device, receives and retransmits the data on a given channel or frequency thereby reducing system complexity compared to multiple devices and/or multiple frequency management.

A method aspect is directed to a method of wireless communication in a wireless communications system that includes a plurality of wireless communications devices configured to communicate with one another on a given channel via a time division based communications protocol. The method includes transmitting from a communications initiation wireless communications device from among the plurality of wireless communications devices, data in an initiator time slot of the given channel.

The method also includes receiving at a repeater wireless communications device from among the plurality of wireless communications devices, the transmitted data from the communications initiation wireless communications device in the initiator time slot. The method further includes retransmitting from the repeater wireless communications device the data in a repeater time slot of the given channel.

The method further includes determining, at a receiver wireless communications device from among the plurality of wireless communications devices, a respective quality metric for data from each of the initiator time slot and the repeater time slot. The method also includes using, at the receiver wireless communications device, data from the initiator time slot or the repeater time slot based upon the respective quality metrics thereof.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
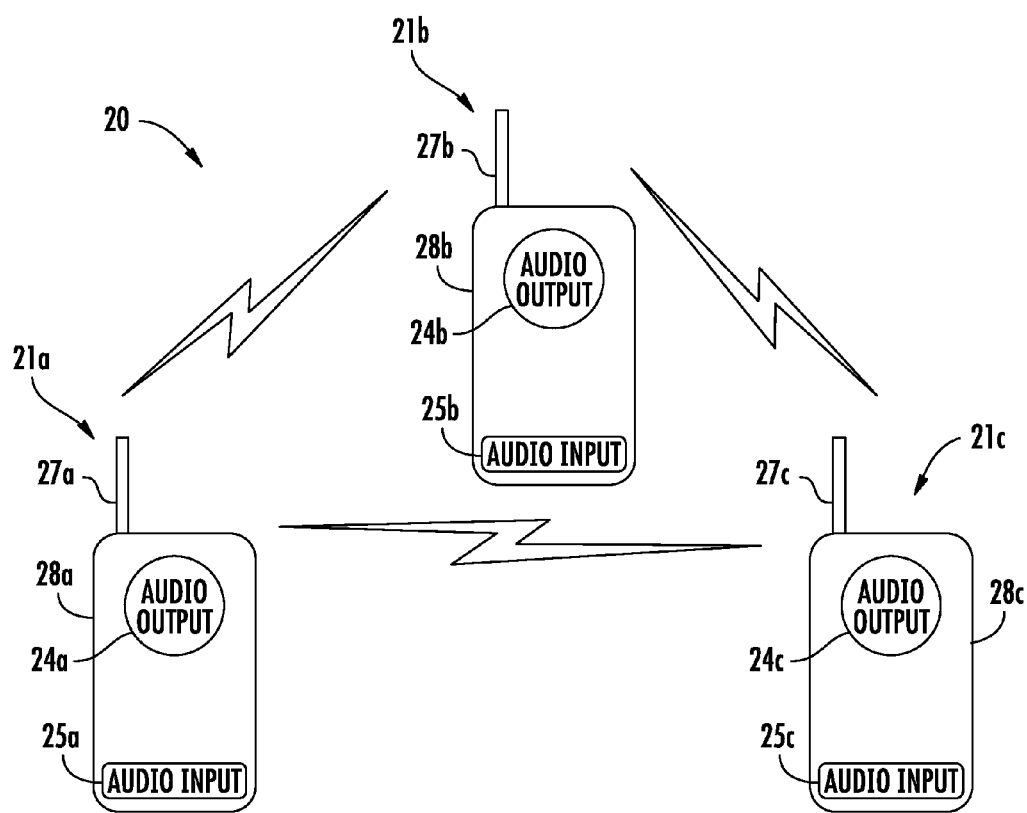
FIG. 1 is a schematic diagram of a wireless communications system in accordance with the present invention.
Figure 2:
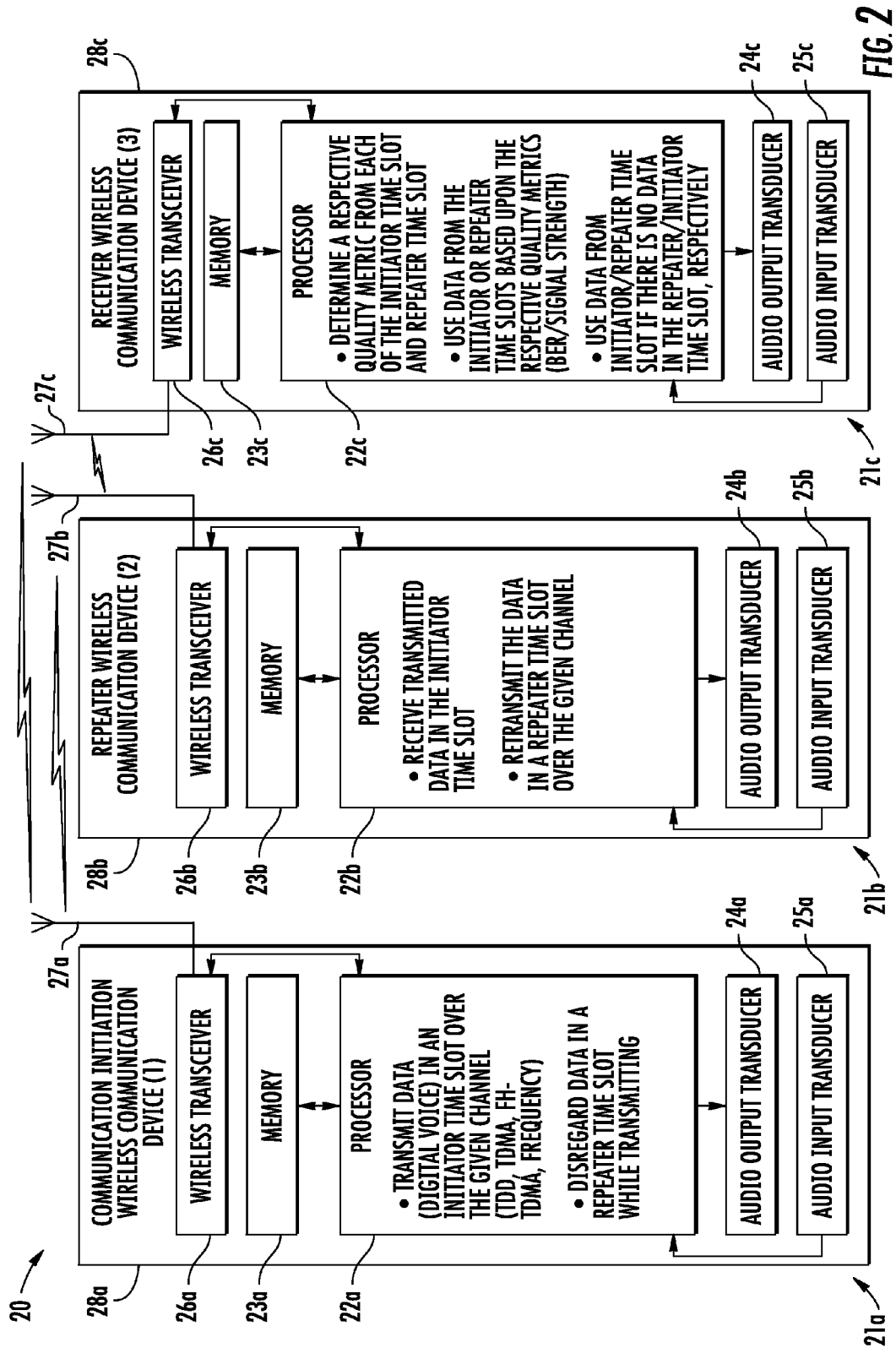
FIG. 2 is a schematic block diagram of mobile wireless communications devices of the wireless communications system of FIG. 1.
Figure 3:
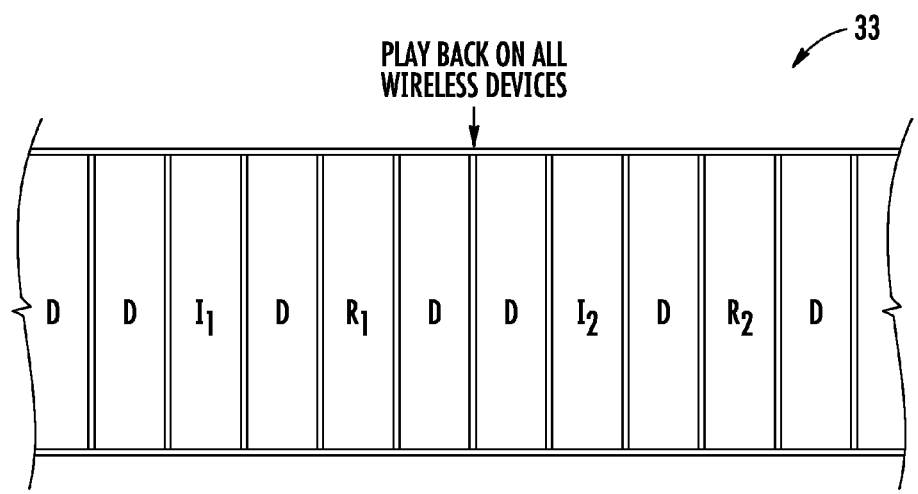
FIG. 3 is a timing slot structure for an example, implementation of the wireless communications devices of FIG. 2.

Referring initially to FIGS. 1-3, a wireless communications system 20 includes mobile wireless communications devices 21a-21c. The wireless communications devices 21a-21c communicate with one another on a given channel via a time division based communications protocol. More particularly, the wireless communications devices 21a-21c communicate with each other on a given frequency via time division duplexing (TDD) in some embodiments. In other embodiments, the wireless communications devices 21a-21c may communicate with each other via time division multiple access (TDMA), or a frequency hopping time division multiple access (FH-TDMA) protocol. In the case of the wireless communications devices 21a-21c communicating via FH-TDMA, the given channel corresponds to the frequencies of communication and these frequencies change over time.

In a single hop configuration, the wireless communications devices 21a-21c communicate data with each other on one of two time slots of a plurality of time slots 33, that is an initiator time slot $I_1$, $I_2$ and a repeater time $R_1$, $R_2$ slot. The data may be voice data, for example. In other embodiments, the data may be another type of data, such as, for example, packet based data. The time slots each have a fixed width. The slot width is dictated by bandwidth available versus bandwidth desired. In other words, the slot width is based upon a desired voice rate. The net bit rate should be greater than the vocoder bit rate, for example, by at least a factor of two. The voice slots are evenly spaced apart maintaining a constant time/slot distance. There are also delay/propagation time slots D to account for turnaround time between time slots, and more particularly, between the initiator time slot and the repeater time slots.

By way of example, the given channel may be a high frequency (HF) channel, and the wireless communications devices 21a-21c may be HF wireless communications devices communicating with each other at an HF frequency. When the given channel is an HF frequency, for example, the voice/data time slot width may be 220 ms with an 80 ms propagation time. This is based upon an assumed 2400 bps modem, 600 bps voice codec, and a 21 byte overhead. The 80 ms is for propagation delay due to around the world bounce. The 21 byte overhead typically accounts for the MAC address, the security parameters, the primitive message type, etc. Therefore, when the channel is HF, 600 ms of voice may be transmitted in a 220 ms slot, which provides enough time for a repeater to receive the message and turn around a retransmission in a second 220 ms slot, for example. It should be noted that this timing is based on a short path retransmission, and delays would be recalculated for a long path retransmission.

A first wireless communications device 21a defines a communication initiation wireless communications device. The communication initiation wireless communications device 21a includes a housing 28a, and processor 22a and a memory 23a coupled thereto and carried by the housing. The communication initiation wireless communications device 21a also includes an audio output transducer 24a and an audio input transducer 25a, both carried by the housing 28a. The communication initiation wireless communications device 21a may include additional input devices. A wireless transceiver 26a is also coupled to the processor 22a, and a respective antenna 27a is coupled to the wireless transceiver. The wireless transceiver 26a cooperates with the processor 22a to perform at least one of data and voice communications function.

The processor 22a is configured to transmit data in the initiator time slot $I_1$ over the given channel, i.e., at the given frequency. More particularly, the communication initiation wireless communications device 21a is the source of the digital audio stream, for example, via the audio input transducer 25a. The processor 22a may ignore any digital voice data that may be in the repeater time slot while transmitting data in the initiator time slot $I_1$. For example, the given channel may be internally monitored to ascertain conditions for determining whether to adjust output power.

A second wireless communications device 21b defines a repeater wireless communications device. The repeater wireless communications device 21b includes a housing 28b, and a processor 22b and a memory 23b coupled thereto and carried by the housing. A wireless transceiver 26b is also coupled to the processor 22b, and a respective antenna 27b is coupled to the wireless transceiver. The wireless transceiver 26b cooperates with the processor 22b to perform at least one data and/or voice communications function.

The processor 22b is configured to receive the transmitted data from the communications initiation wireless communications device 21a in the initiator time slot $I_1$. The processor 22b is configured to retransmit the digital voice data in the repeater time slot $R_1$ of the given channel, i.e. at the given frequency. The processor 22b retransmits the data in the repeater time slot $R_1$ based upon the receipt of the digital voice data in the initiator time slot $I_1$. Prior to retransmission of the digital voice data, the processor 22b adds header information indicative of the source of the retransmission. In other words, the processor 22b adds header information so that a downstream receiving wireless communications device is aware of the source of the received digital voice data.

The repeater wireless communications device 21*b* also includes an audio output transducer 24*b* and an audio input transducer 25*b* carried by the housing 28*b* and coupled to the processor 22*b*. The processor 22*b* plays the digital voice data via the audio output transducer 24*b* between the two delay/propagation slots D after the repeater time slot $R_1$, but before the initiator time slot $I_2$ in the next sequence. Of course, in embodiments where the data is not digital voice data, for example, the repeater wireless communications device 21*b* may not include an audio output transducer. Instead, the repeater wireless communications device 21*b* may include a display, for example, or other device for outputting the data.

A third wireless communications device 21*c* defines a receiver wireless communications device. The receiver wireless communications device 21*c* includes a housing 28*c*, and a processor 22*c* and a memory 23*c* coupled thereto carried by the housing. A wireless transceiver 26*c* is also coupled to the processor 22*c*, and a respective antenna 27*c* is coupled to the wireless transceiver. The wireless transceiver 26*c* cooperates with the processor 22*c* to perform at least one data of and voice communications function.

The processor 22*c* is configured to determine a respective quality metric for the digital voice data from each of the initiator time slot $I_1$ and the repeater time slot $R_1$. For example, the quality metric may include a bit error rate of the digital voice data in each of the initiator and repeater time slots $I_1$, $R_1$. The quality metric may also include signal strength data for the digital voice data in each of the initiator and repeater time slots $I_1$, $R_1$.

Similar to the repeater receiver wireless communications device 21*b*, the receiver wireless communications device 21*c* also includes an audio output transducer 24*c* and an audio input transducer 25*c* coupled to the processor 22*c*. The processor 22*c* plays the digital voice data via the audio output transducer 24*c* between delay/propagation slots D after the repeater time slot $R_1$, but before the initiator time slot $I_2$ in the next sequence. The digital voice data is played from the initiator time slot $I_1$ or the repeater time slot $R_1$ based upon the respective quality metrics thereof. Of course, in other embodiments where the data is not necessarily digital voice data, the processor 22*c* uses data from the initiator time slot or the repeater time slot $R_1$ based upon the respective quality metrics thereof and outputs the data accordingly.

Additionally, the processor 22*c* is also configured to play back or use digital voice data from the repeater time slot $R_1$ based upon the initiator time slot $I_1$ having no data. Still further, the processor 22*c* is configured to play back or use data from the initiator time slot $I_1$ based upon the repeater time slot $R_1$ having no data. For example, in the next transmission sequence, the processor 22*c* may play back digital audio data with the determined respective quality metrics being that there is no digital voice data in either of the initiator time slot or the repeater time slot $I_2$, $R_2$. It should be noted that when the receiver wireless communications device 21*c* plays back the digital voice data, the repeater wireless communications device may also play back the digital voice data, i.e., they are synchronized. The process (initiation, retransmission, and receiving) may be repeated for the next time sequence based upon the next initiation time slot $I_2$ and the next repeater time slot $R_2$, and also for subsequent time sequences.

Figure 4:
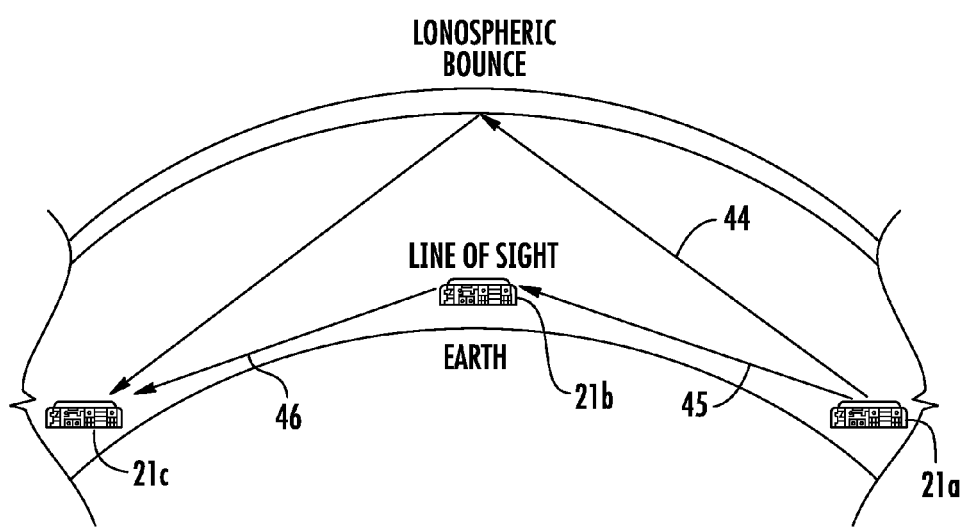
FIG. 4 is a schematic diagram of an example implementation of the wireless communications system of FIG. 1.

Referring now to FIG. 4, one advantageous implementation of an example wireless communications system 20 may be in an HF system. Illustratively, the communications initiation wireless communications device 21*a*, the repeater wireless communications device 21*b*, and the receiver wireless communications device 21*c* are geographically spaced apart at ground level of the Earth. HF signals may propagate using skywave propagation based upon the Earth's ionosphere, line of sight, or groundwave propagation, for example. The communications initiation wireless communications device 21*a* transmits buffered audio in the initiator time slot. A single frame of audio is transmitted by the communications initiation wireless communications device 21*a*. The repeater wireless communications device 21*b* receives the frame of audio via line of sight 45 and waits 80 ms (assuming a short path retransmission) before retransmitting the same data packet or digital voice data. The communications initiation wireless communications device 21*a* waits 160 ms plus the time for transmission before transmitting a second digital audio packet. The receiver wireless communications device 21*c* receives the frame of audio from both the initiations wireless communications device 21*a* via ionospheric bounce 44, and via line of sight 46 from the repeater wireless communications device 21*b*. The receiver wireless communications device 21*c* determines which reception is best based upon the quality metric, i.e., the initiator time slot or the repeater time slot. The receiver wireless communications device 21*c* plays back the digital audio from the initiator time slot or the repeater time slot based upon the respective quality metrics thereof.

Figure 5:
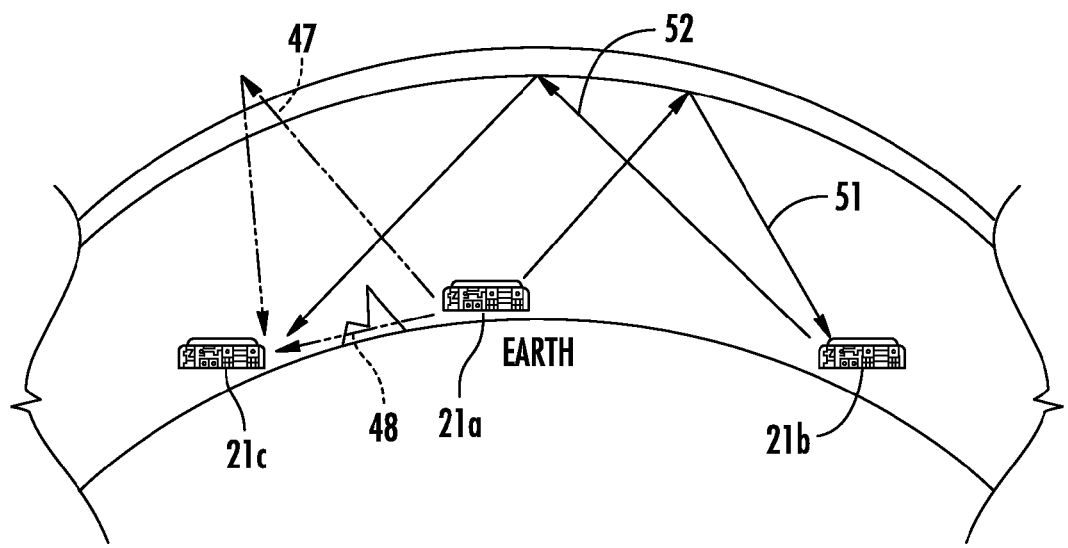
FIG. 5 is another schematic diagram of an example implementation of the wireless communications system of FIG.

Referring now to FIG. 5, another advantageous implementation of an example wireless communications system 20 may be in an HF system. The communications initiation wireless communications device 21*a* transmits digital voice data in the initiator time slot, but near vertical incidence skywave (NVIS) 47 fails because of too steep of an angle. Line of sight transmission 48 also fails because of a blockage, for example, a mountain. Illustratively, the repeater wireless communications device 21*b*, which is beyond the line of sight from the communications initiation wireless communications device 21*a*, receives the transmitted digital voice data via skywave 51. The repeater wireless communications device 21*b* retransmits the digital voice data in the repeater time slot, and because of the ionospheric bounce 52, the retransmitted digital voice data is received at the receiver wireless communications device 21*c*. Of course, there is a delay, for example, for propagation, between receipt of the digital voice data and the retransmission of the digital voice data. This implementation may be particularly advantageous for 3G automatic link establishment (ALE) for broadcasting of data, for example.

Figure 6:
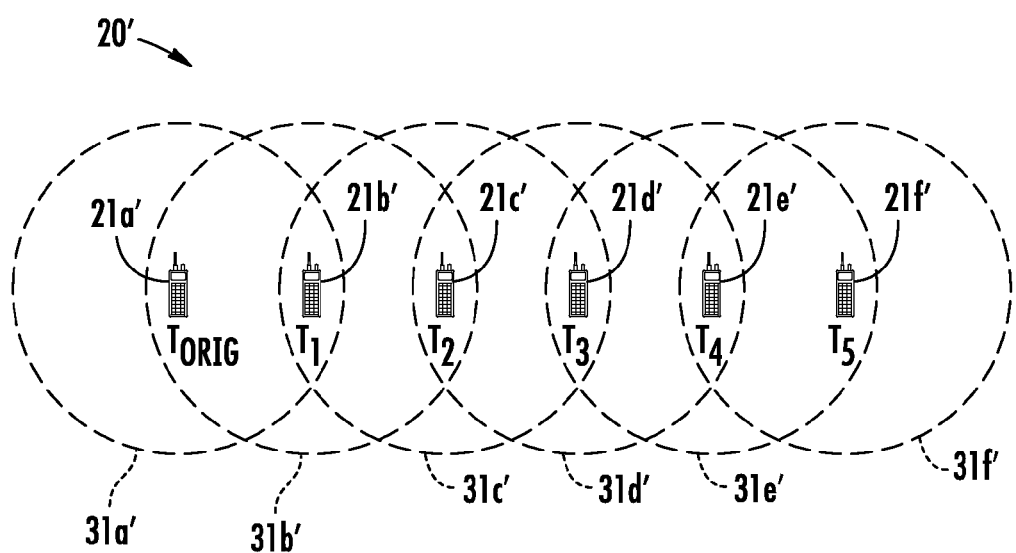
FIG. 6 is a schematic diagram of a wireless communications system in accordance with another embodiment of the present invention.
Figure 7:
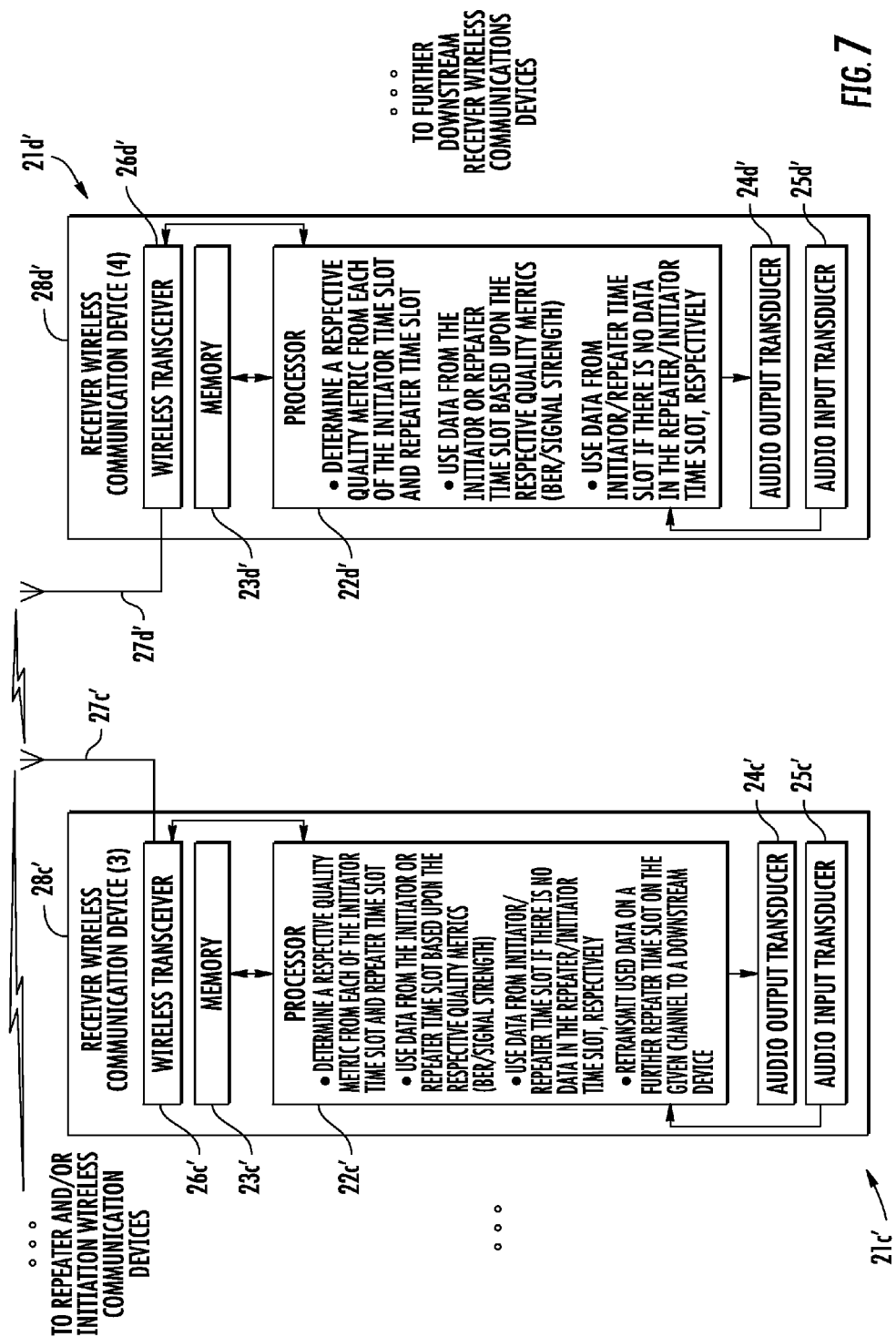
FIG. 7 is a schematic diagram of receiver wireless communications devices of the system of FIG. 6.
Figure 8:
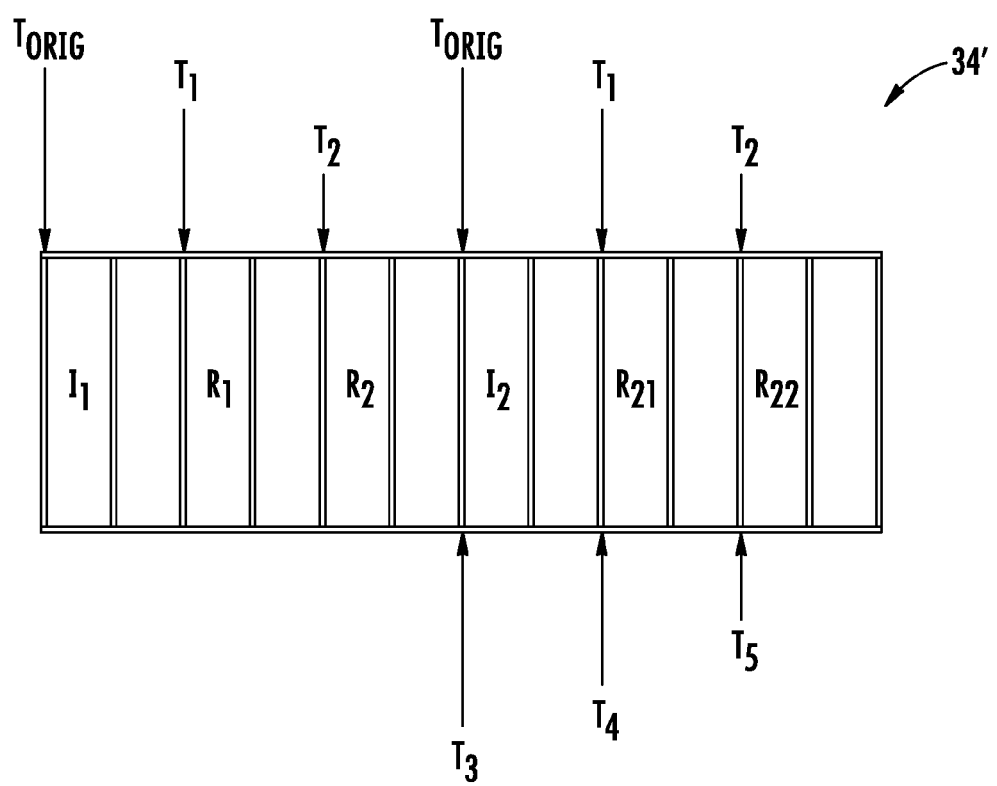
FIG. 8 is a timing slot structure for use with the wireless communications system of FIGS. 6 and 7.

Referring now to FIGS. 6-8, in another embodiment, the receiver wireless communications device 21*c'* may also function as a repeater wireless communications device. More particularly, when there are three time slots, the number of hops may be theoretically infinite.

The processor 22*a'* of the communications initiation wireless communications device 21*a'* originates and transmits digital voice data in the initiator time slot $I_1$ at time $T_{ORIG}$ of the timing slot structure 34'. It is noted that $T_\#$ refers to time by the number of hops, $I_\#$ refers to an initiator time slot, and $R_\#$ refers to a repeater time slot. The communications initiation wireless communications device 21*a'* has a range 31*a'* associated therewith. The repeater wireless communications device 21*b'*, which has a range 31*b'* associated therewith, retransmits the digital voice data in the first repeater time slot $R_1$ at $T_1$. The processor 22*c'* of the receiver wireless communications device 21*c'* analyzes the header information of the digital voice data received in either or both of the initiator and repeater time slots $I_1$, $R_1$. The receiver wireless communications device 21*c'* has a range 31*c'* associated therewith. Based upon the header information, the processor 22*c'* may select to operate as a repeater wireless communications device and retransmit the played back digital voice data, i.e., based upon the respective quality metrics, in a second repeater time slot $R_2$. The receiver wireless communications device, when operating as a repeater wireless communications device, retransmits the digital voice data in a second repeater time slot $R_2$ at $T_2$.

The communications initiation wireless communications device 21a' can then again transmit or originate digital voice data in the initiator time slot $I_2$ at $T_{ORIG}$ of the next sequence. The DV data is repeated at $T_1$ and $T_2$ as described above in the respective first and second repeater time slots $R_{21}$, $R_{22}$ of the next sequence. Additional retransmissions are denoted by $T_3$, $T_4$, and $T_5$ respectively by wireless communications devices 21d', 21e', 21f', having respective ranges 31d', 31e', 31f', where $T_\#$ is the number of hops from the communications initiation wireless communications device 21a'. Each of the wireless communications devices 21d' and 21e' operates similar to the receiver wireless communications device 21c' described above in that they operate also as a repeater wireless communications device. Wireless communications device 21f' operates as a receiver wireless communications device, but may also operate as a repeater wireless communications device to provide service to downstream devices.

Illustratively the digital voice may be repeated at $T_3$ in the initiator time slot since the mobile device 21d' corresponding to $T_3$ on the next sequence is out of range 31a' of the communications initiation wireless communications device 21a' ($T_{ORIG}$). In other words, retransmissions occupy the same three slots as the original and first two repeaters. Advantageously, the effect and occurrence of collisions are reduced due to the time and distance.

Figure 9:
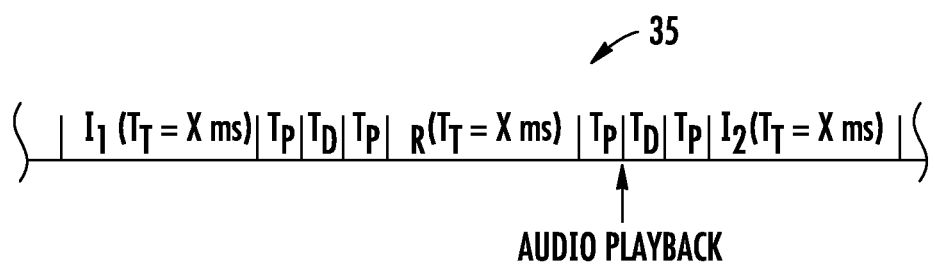
FIG. 9 is a more detailed schematic diagram of a timing slot structure for use with a wireless communications system according to the present invention.

Referring now additionally to FIG. 9, timing of transmissions or retransmissions is illustrated in the diagram 35. In a fixed frequency channel, for example, in TDD, the timing is fixed. The timing includes a time for transmission $T_T$, a time for propagation $T_P$, and a time of delay $T_D$. A TDD implementation may allow for asynchronous startup and reception, for example. More particularly, the repeater wireless communications device 21b may correlate on a preamble of the digital voice data (packet), which is described in further detail below. Alternatively, startup may occur with receipt of any digital voice data packet or audio stream due to packetization, for example.

Illustratively, the communications initiation wireless communications device 21a transmits in the initiator time slot $I_1$ of, for example, 80 ms. Prior to the repeater wireless communications device 21b retransmitting the digital voice data in the repeater time slot $R_1$, the repeater wireless communications device waits a time for propagation $T_P$, a time of delay $T_D$, and another time for propagation $T_P$. After another set of a time for propagation $T_p$, a time of delay $T_D$, and another time for propagation $T_P$, the communications initiation wireless communications device 21a again transmits in the initiator time slot $I_2$. In other words, the communications initiation wireless communications device 21a waits a total of 4 $T_P$ and 2 $T_D$ before transmitting again. The communications initiation wireless communications device 21a and the repeater wireless communications device 21b alternate transmitting. Audio play back may occur anytime after the transmitted data from the repeater wireless communications device 21b is receiver and/or processed, or should have been received and/or processed. Audio play back may also be buffered, i.e. delayed, further before play back.

Figure 10:
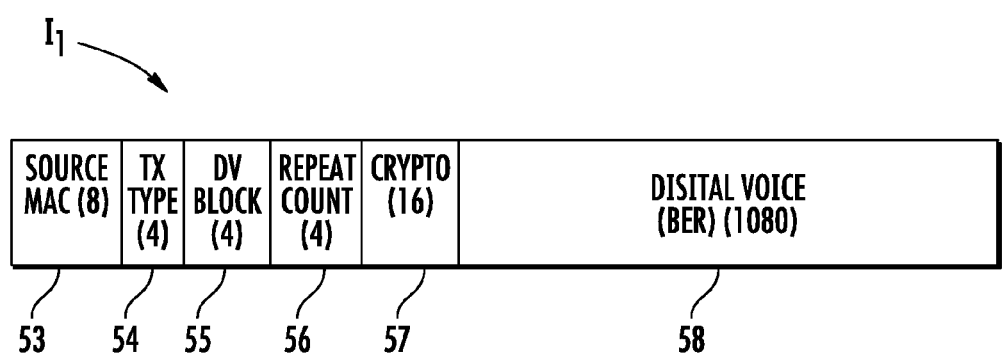
FIG. 10 is a more detailed schematic diagram of the initiator time slots of FIG. 9.

Referring now additionally to FIG. 10, an example voice frame, for example, transmitted in the initiator time slot $I_1$ is illustrated. The digital voice data or frame in an initiator time slot $I_1$ includes a source media access control (MAC) address slot 53 having a size of 8 bits. The source MAC address slot 53 includes a fixed pre-defined MAC address that identifies the source of the transmission, i.e., the communications initiation wireless communications device 21a. The source MAC address has the same value even from the repeater wireless communications device 21b.

The initiator time slot $I_1$ also includes a transmission type slot 54 having a size of 4 bits. The transmission type slot 54 identifies the type of transmission as either an original transmission (0x00) or a retransmission from the first repeater wireless communications device (0x01) 21b.

The initiator time slot $I_1$ also includes a digital voice block 55 following the transmission type slot and having a size of 4 bits. The digital voice block 55 is used for infinite hop layout, for example, up to $2^N$ hops. The digital voice block 55 allows for differentiation between sequences received out of order, for example.

Following the digital voice block 55, a repeat count slot 56 having a size of 4 bits. If there is more than one repeater wireless communications device, each wireless communications device uses the hop count to identify its distance from the original source, i.e. the initiator wireless communications device. Data within the repeat count slot 56 indicates a number of hops from the source of the digital voice data, i.e., the number of hops from the communications initiation wireless communications device 21a. This advantageously allows a wireless communications device to determine it should retransmit the received data. An optional cryptographic block 57 of 16 bits follows the repeat count slot 55 and may be used for block cipher, for example.

A digital voice (DV) frame 58 follows the cryptographic block 57 and has a size of 1080 bits. Packaged digital voice, or data, is packaged in the DV frame 58. For example, the digital voice frame 58 may include 20 frames of coded audio at 2400 bits per second. The data rate is less than the channel rate, and the packaged digital voice may not be decoded prior to retransmission for a repeater wireless communications device. The DV frame 58 may include a bit error rate (BER) pattern for receiver diversity if direct signal-to-noise ratio detection is not possible. The voice frame layout described above with respect to the initiator time slot $I_1$ is also applicable to subsequent initiator time slots, for example, $I_2$.

Figure 11A:
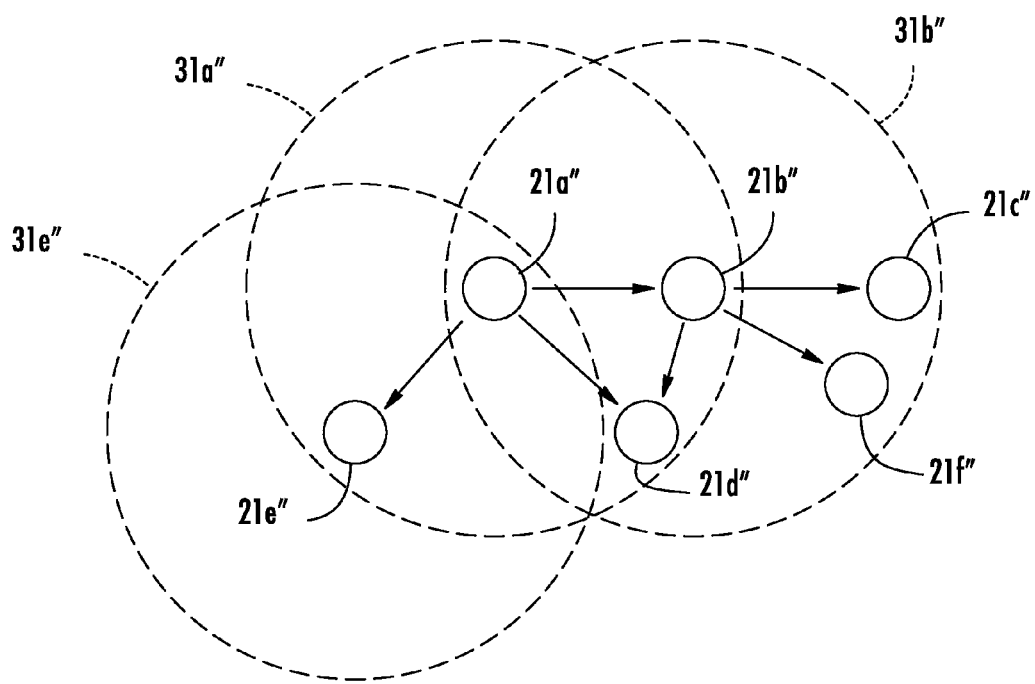
FIGS. 11a-11c are schematic diagrams of a wireless communications system according to another embodiment of the present invention.
Figure 11B:
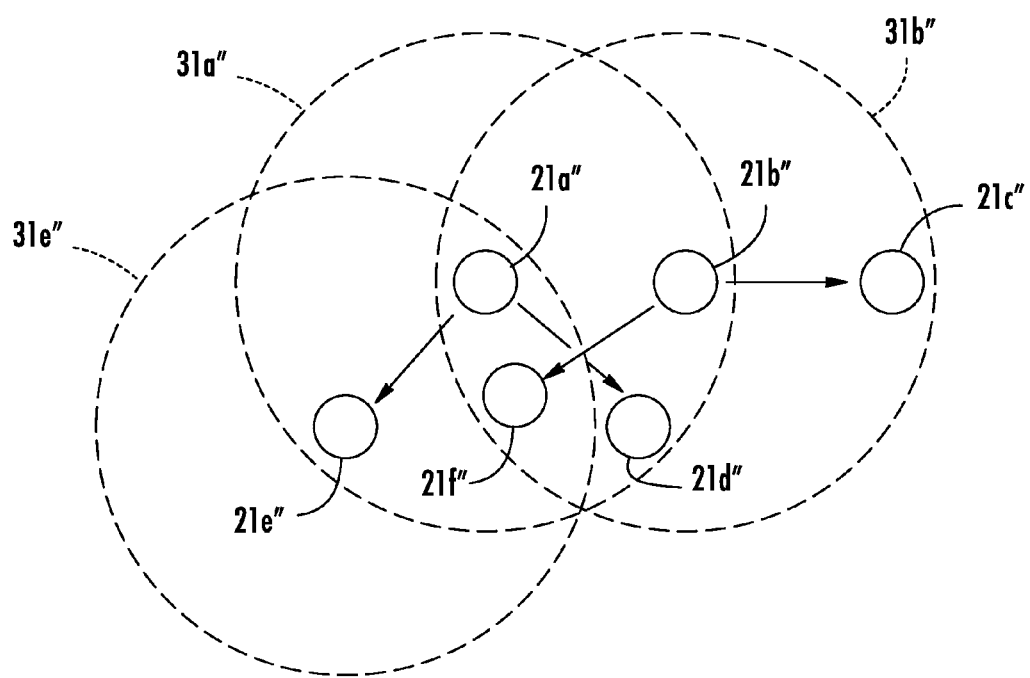
Figure 11C:
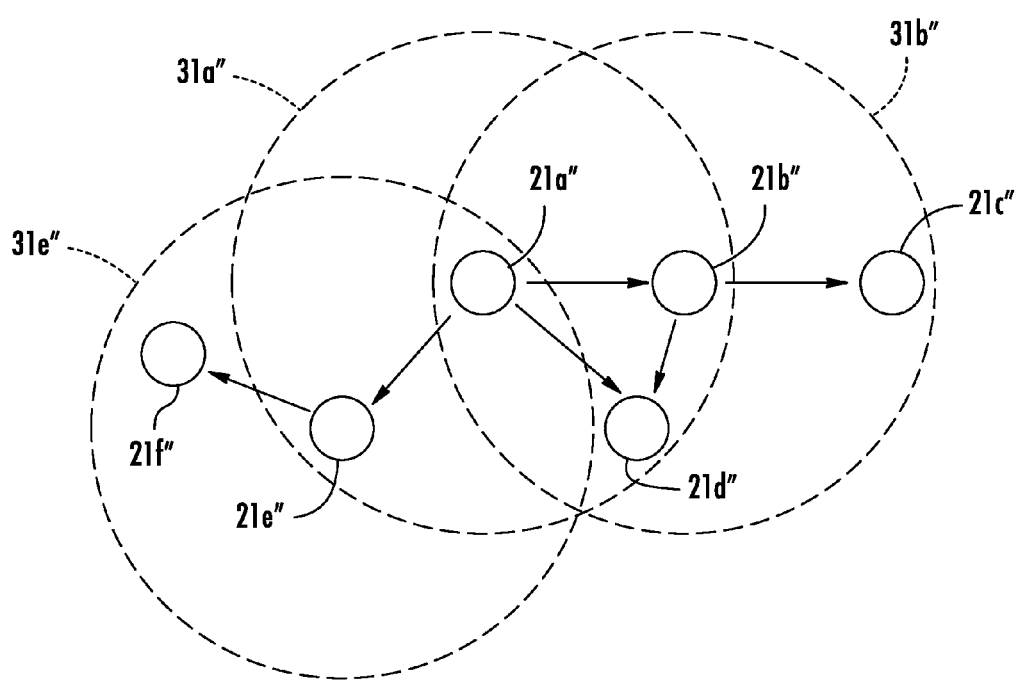

Referring now additionally to FIGS. 11a-11c, an example wireless communication system illustrating the concept of receiver diversity is shown. Referring particularly to FIG. 11a, the communication initiation wireless communications device 21a" transmits the DV data in the initiator time slot. The repeater wireless communications device 21b" receives the transmitted data from the communications initiation wireless communications device 21a". Wireless communications device 21b" retransmits the DV data in the repeater time slot.

Since wireless communications device 21d" is within ranges 31a", 31b" of wireless communications devices 21a", 21b", wireless communications device 21d", i.e., a receiver wireless communications device, receives both the transmitted data from the communications initiation wireless communications device 21a" and the retransmitted data from the repeater wireless communications device 21b", and may determine, as described above, which data from the initiator time slot or the repeater time slot to use. Wireless communications devices 21c" and 21f" receive the retransmitted data from the repeater wireless communications device 21b" since it is within range 31b", but does not receive the original transmitted DV data since they are out of range 31a" of the communications initiation wireless communications device 21a". Wireless communications device 21e" receives transmitted data from the communications initiation wireless communications device 21a", and operates as a repeater wireless communications device.

Referring now more particularly to FIG. 11b, the mobile device 21f" moves to within the range 31a" of the communications initiation wireless communications device 21a" as illustrated. Wireless communications device 21f" receives both the transmitted data from the communications initiation wireless communications device 21a" and the repeater wireless communications device 21b" since it is now within respective ranges 31a", 31b". The wireless device 21f", defining a receiver wireless communications device, plays back the DV data based upon the respective quality metrics as described above. It should be noted that the wireless communications device 21f" may initially play back DV data based upon the data received by the communications initiation wireless communications device 21a", but, for example, because of changes in the quality metrics, may switch to play back DV data from the repeater wireless communications device 21b". This change may be relatively seamless to a user, for example.

Referring more particularly to FIG. 11c, the mobile device 21f" moves outside the range 31b" of the repeater wireless communications device 21b", but remains within the range 31a" of the communications initiation wireless communications device 21a". The wireless device 21f" has also moved within the range of wireless communications device 21e". Wireless communications device 21e" defines a repeater wireless communications device so that wireless communications device 21f" receives DV data from both the communications initiation wireless communications device 21a" and the wireless device 21e". The wireless device 21f" plays back the DV data based upon the respective quality metrics as described above. If, for example, mobile device 21f" were out of range of wireless device 21e", the wireless device 21f" would receive DV data only from the communications initiation wireless communications device 21a" and play back the DV audio using the data within the initiator time slot. It should be noted that any of the wireless communications devices may operate in any role as a repeater, initiator, or receiver.

Figure 12:
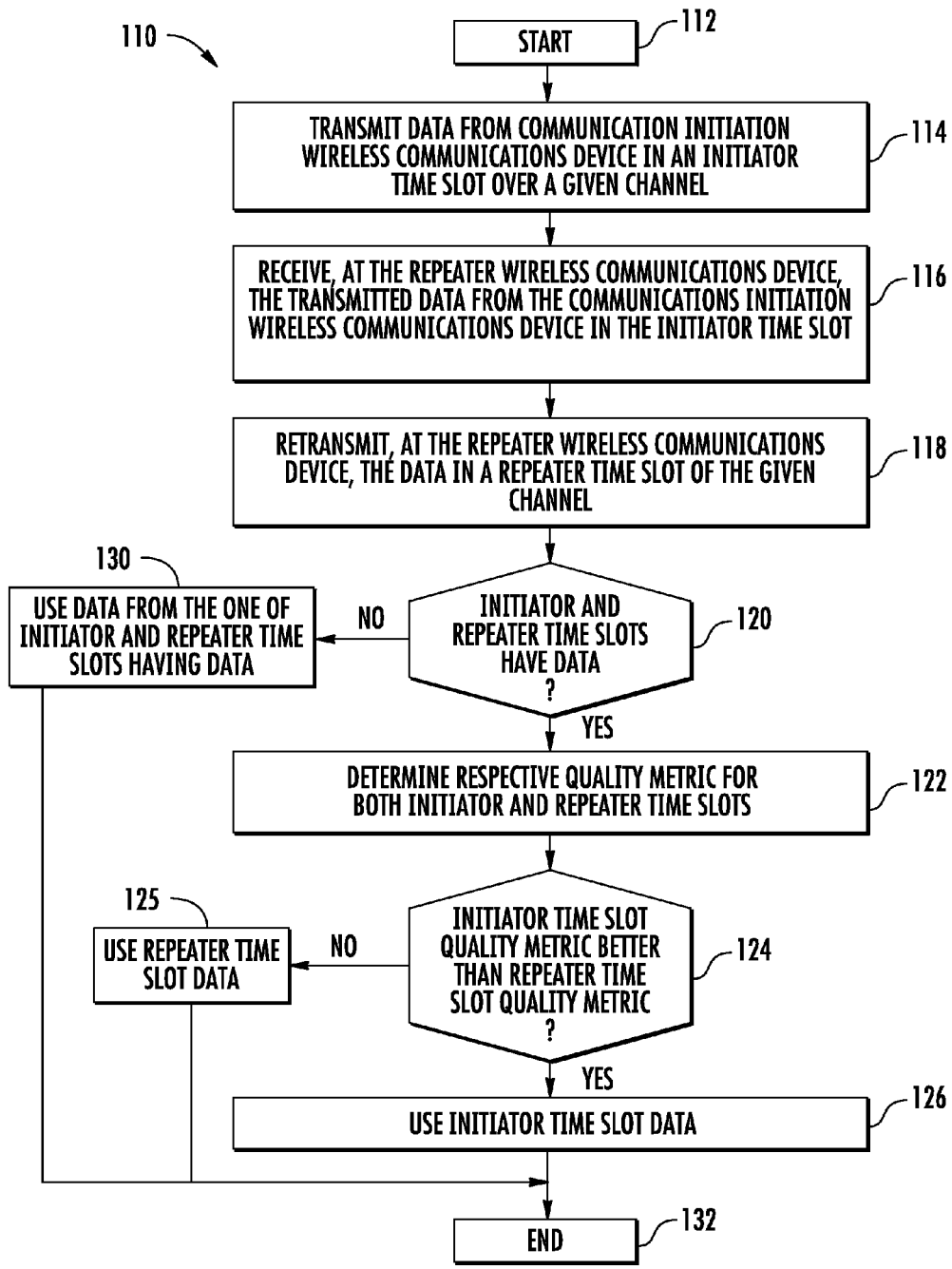
FIG. 12 is a flow chart of a method of wireless communication in accordance with the present invention.

Referring now to the flowchart 110 in FIG. 12, beginning at Block 112, a method aspect is directed to a method of wireless communication in a wireless communications system 20 including a plurality of wireless communications devices 21a, 21b, 21c configured to communicate with one another on a given channel via a time division based communications protocol. The method includes at Block 114, transmitting from a first wireless communications device 21a defining a communication initiation wireless communications device, data in an initiator time slot over the given channel.

At Block 116, the method includes receiving at a repeater wireless communications device 21b from among the plurality of wireless communications devices, the transmitted data from the communications initiation wireless communications device in the initiator time slot. The repeater wireless communications device 21b retransmits the data in a repeater time slot of the given channel (Block 118).

At Block 120, the method includes determining, at a receiver wireless communications device 21c from among the plurality of wireless communications devices, if the initiator and repeater time slots have data. If both the initiator and repeater time slots have data, a respective quality metric for data from each of the initiator time slot and the repeater time slot is determined (Block 122). The respective quality metrics are compared at Block 124 to find out which of the initiator time slot and the repeater time slot has higher quality data. If the initiator time slot has higher quality data, based upon the respective quality metric, the receiver wireless communications device 21c uses the data from the initiator time slot (Block 126). Alternatively, if the repeater time slot has higher quality data, based upon the respective quality metric, the receiver wireless communications device 21c uses the data from the repeater time slot (Block 128).

If it was determined at Block 120 that one of the initiator or repeater time slots have data, the receiver wireless communications device 21c uses data from the time slot having data (Block 130). The method ends at Block 132.

While in the embodiments described, functions have been described by way of the wireless devices performing the functions, it should noted that the respective processors of each wireless communications device cooperate with the respective memory to perform the corresponding functions. Moreover, while the data has been described with respect to digital voice data, it should be noted that the principles of the embodiments described herein may be applicable to other types of data communicated using any time based protocol. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications system comprising:
   a plurality of mobile wireless communications devices configured to communicate with one another on a given channel in a mobile ad-hoc network and via a time division based communications protocol;
   said plurality of mobile wireless communications devices comprising
      a communication initiation mobile wireless communications device configured to transmit data in an initiator time slot of the given channel,
      a repeater mobile wireless communications device configured to receive the transmitted data from said communications initiation mobile wireless communications device in the initiator time slot and retransmit the data in a repeater time slot of the given channel, and
      a receiver mobile wireless communications device configured to
         determine a respective quality metric for data from each of the initiator time slot and the repeater time slot, and
         use data from the initiator time slot or the repeater time slot based upon the respective quality metrics thereof.

2. The wireless communications system of claim 1, wherein said receiver mobile wireless communications device is configured to use data from the repeater time slot based upon the initiator time slot having no data.

3. The wireless communications system of claim 1, wherein said receiver mobile wireless communications device is configured to use data from the initiator time slot based upon the repeater time slot having no data.

4. The wireless communications system of claim 1, wherein said receiver mobile wireless communications device is configured to retransmit the used data in a further repeater slot on the given channel to a downstream mobile wireless communications device.

5. The wireless communications system of claim 1, wherein the respective quality metric comprises at least one of a bit error rate (BER) and a signal strength.

6. The wireless communications system of claim 1, wherein the time division based communications protocol comprises time division duplexing (TDD).

7. The wireless communications system of claim 1, wherein time division based communications protocol comprises time division multiple access (TDMA).

8. The wireless communications system of claim 1, wherein time division based communications protocol comprises a time division frequency hopping protocol.

9. The wireless communications system of claim 1, wherein said initiator mobile wireless communications device is configured to disregard data received in the repeater time slot while transmitting in the initiator time slot.

10. A wireless communications system comprising:
a plurality of mobile wireless communications devices configured to communicate with one another on a given frequency in a mobile ad-hoc network and via a time division based communications protocol;
said plurality of mobile wireless communications devices comprising
a communication initiation mobile wireless communications device configured to transmit data in an initiator time slot of the given frequency,
a repeater mobile wireless communications device configured to receive the transmitted data from said communications initiation mobile wireless communications device in the initiator time slot and retransmit the data in a repeater time slot of the given frequency, and
a receiver mobile wireless communications device configured to
determine a respective quality metric for data from each of the initiator time slot and the repeater time slot,
use data from the initiator time slot or the repeater time slot based upon the respective quality metrics thereof, and
use data from the repeater time slot based upon the initiator time slot having no data.

11. The wireless communications system of claim 10, wherein said receiver mobile wireless communications device is configured to retransmit the used data in a further repeater slot on the given frequency to a downstream mobile wireless communications device.

12. The wireless communications system of claim 10, wherein the respective quality metric comprises at least one of a bit error rate (BER) and a signal strength.

13. The wireless communications system of claim 10, wherein the time division based communications protocol comprises time division duplexing (TDD).

14. The wireless communications system of claim 10, wherein time division based communications protocol comprises time division multiple access (TDMA).

15. A method of wireless communication in a wireless communications system comprising a plurality of mobile wireless communications devices configured to communicate with one another on a given channel in a mobile ad-hoc network and via a time division based communications protocol, the method comprising:
transmitting from a communication initiation mobile wireless communications device from among the plurality of mobile wireless communications devices data in an initiator time slot of the given channel;
receiving at a repeater mobile wireless communications device from among the plurality of mobile wireless communications devices the transmitted data from the communications initiation mobile wireless communications device in the initiator time slot;
retransmitting from the repeater mobile wireless communications device the data in a repeater time slot of the given channel;
determining at a receiver mobile wireless communications device from among the plurality of mobile wireless communications devices a respective quality metric for data from each of the initiator time slot and the repeater time slot; and
using, at the receiver mobile wireless communications device, data from the initiator time slot or the repeater time slot based upon the respective quality metrics thereof.

16. The method of claim 15, further comprising using, at the receiver mobile wireless communications device, data from the repeater time slot based upon the initiator time slot having no data.

17. The method of claim 15, further comprising using, at the receiver mobile wireless communications device, data from the initiator time slot based upon the repeater time slot having no data.

18. The method of claim 15, further comprising retransmitting from the receiver mobile wireless communications device the used data in a further repeater slot on the given channel to a downstream mobile wireless communications device.

19. The method of claim 15, wherein determining respective quality metric comprises determining at least one of a bit error rate (BER) and a signal strength.

* * * * *